US007027577B2

(12) United States Patent
Gourraud et al.

(10) Patent No.: US 7,027,577 B2
(45) Date of Patent: Apr. 11, 2006

(54) METHOD AND SYSTEM FOR MULTI-PARTY CALL CONFERENCING

(75) Inventors: Christophe Gourraud, Montreal (CA); Paul Tidwell, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 456 days.

(21) Appl. No.: 10/227,503

(22) Filed: Aug. 26, 2002

(65) Prior Publication Data

US 2004/0037407 A1 Feb. 26, 2004

(51) Int. Cl.
*H04L 12/66* (2006.01)
(52) U.S. Cl. ............................ 379/202.01; 379/201.01; 379/221.04
(58) Field of Classification Search ............ 379/202.01, 379/88.17, 207.01, 201.01, 221.03, 221.04, 379/279, 219, 158; 455/416, 414.1
See application file for complete search history.

(56) References Cited

U.S. PATENT DOCUMENTS

| 5,513,257 | A  | * | 4/1996 | Yoo et al. ............... 379/221.03 |
| 6,400,925 | B1 | * | 6/2002 | Tirabassi et al. ........... 455/12.1 |
| 2001/0002927 | A1 | * | 6/2001 | Detampel, Jr. et al. |
| 2002/0127995 | A1 | * | 9/2002 | Faccinn et al. |
| 2003/0021400 | A1 | * | 1/2003 | Grandgent et al. |
| 2003/0026245 | A1 | * | 2/2003 | Ejzak |
| 2004/0196867 | A1 | * | 10/2004 | Ejzak et al. |

OTHER PUBLICATIONS

3GPP TS 23.218 V2.0.1, 3rd Generation Partnership Project; Technical Specification Group Core Network; IP Multimedia (IM) Session Handling; IP Multimedia (IM) Call Model; Stage 2 (Release 5), Mar. 2002.
3GPP TS 23.228 V5.3.0, 3rd Generation Partnership Project, Technical Specification Group Services and System Aspects, IP Multimedia Subsystem (IMS), Stage 2 (Release 5), Jan. 2002.

* cited by examiner

*Primary Examiner*—William J. Deane, Jr.
(74) *Attorney, Agent, or Firm*—Alex Nicolaescu, Ericsson Canada Inc.

(57) ABSTRACT

A method and system for selecting a Multimedia Resource Function Controller (MRFC) for allocating resources for a conference call based on a pre-defined condition. In a first embodiment, the condition is associated with a status of an MRFC of a first network, such as an overload of resources, a failure, or an inexistence of the MRFC in the first network. When the condition is detected, an application server (AS) of the first network delegates the responsibility of allocating the resources for the conference call to an MRFC of a second network. In a second embodiment, the pre-defined condition is associated with a location of a User Equipment (UE) involved in the conference call. Based on the UE's location, the AS of the first network selects an MRFC of a second network, and delegates the responsibility of allocating the resources for the conference call to the MRFC of the second network.

31 Claims, 3 Drawing Sheets

METHOD AND SYSTEM FOR MULTI-PARTY CALL CONFERENCING

BACKGROUND OF THE INVENTION

1. Field of the Invention

The present invention relates to call conferencing.

2. Description of the Related Art

Voice call conferencing is a concept well known in the art, and exists both in fixed and cellular telephony. Typically, it allows more than two parties, or communication terminals, to be involved in the same communications session. For example, when two parties are involved in a communications session, it may be desirable to invite one or more parties to the same session. This may be achieved by dialling a special code number associated with a call conferencing service activation feature, followed by the identification number of the party to be invited. A telephone switch then connects that party to the ongoing voice call between the first and the second party.

With the fast evolution of telephone networks, various communications protocols have defined new and more flexible manners of handling voice and data call sessions in telecommunications networks. The Session Initiation Protocol (SIP) is an Internet Engineering Task Force (IETF) standard protocol for initiating an interactive user session that may involve multimedia elements such as video, voice, chat, gaming, and virtual reality. Like the Hyper Text Terminal Protocol (HTTP), or the Simple Mail Transfer Protocol (SMTP), SIP works in the Application layer of the Open Systems Interconnection (OSI) communications model. SIP can establish multimedia sessions or Internet telephony calls, and modify, or terminate them. Because SIP supports name mapping and redirection services, it makes it possible for users to initiate and receive communications and services from any location, and for networks to identify the users wherever they are. SIP is a request-response protocol, dealing with requests from clients and responses from servers. Participants are usually identified by SIP Uniform Resource Locators (URLs) or Uniform Resource Identifiers (URIs), although SIP also supports E.164 telephone number addressing. Requests can be sent through any transport protocol, such as the User Datagram Protocol (UDP), the Simple Control Transport Protocol (SCTP), or the Transfer Control Protocol (TCP). SIP determines the end system to be used for the session, the communication media and media parameters, and the called party's desire to engage in the communication. Once these are assured, SIP establishes call parameters at either end of the communication, and handles call transfer and termination. The Session Initiation Protocol is specified in IETF Request for Comments (RFC) 2543, which is herein included by reference.

Figure 1:
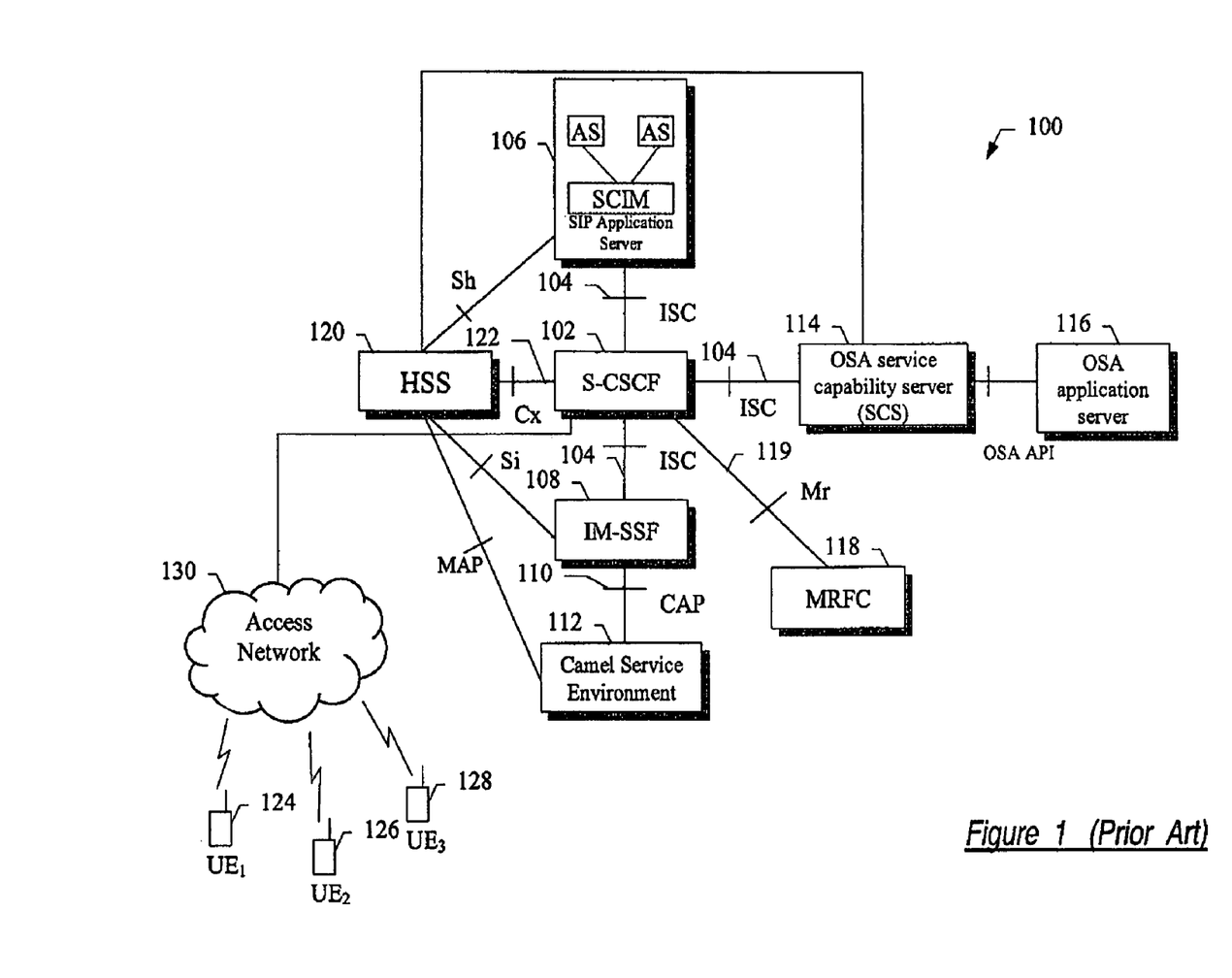
FIG. 1 (Prior Art) is a $3^{rd}$ Generation Partnership Project (3GPP) high-level network reference model for IP Multimedia session handling.

Regarding conference call, the Third Generation Partnership Project (3GPP) Technical Specifications (TS) 23.218 and 23.228 Release 5 describe a network reference model and a set of procedures defining how call conferencing is to be performed. Reference is now made to FIG. 1 (Prior Art), which is a high-level network reference model of a 3GPP network 100 for IP Multimedia session handling. Shown in the centre of FIG. 1 is a Serving Call State Control Function (S-CSCF) 102 that is responsible for handling the SIP call sessions and conference calls for the subscribers of network 100 as it is known in the art. S-CSCF 102 is linked via an IP Multimedia Service Control (ISC) interface 104 to an SIP Application Server (AS) 106 that executes various services for influencing and impacting the SIP sessions. Also connected to S-CSCF 102 via a similar ISC interface 104 is an IP Multimedia Service Switching Function (IM-SSF) 108, which hosts Customized Applications for Mobile network Enhanced Logic (CAMEL) network features (i.e. trigger detection points, CAMEL Service Switching Finite State Machine, etc). A CAMEL Application Part (CAP) interface 110 connects the IM-SSF 108 with a Camel Service Environment 112 as specified in 3GPP TS 29.078, herein included by reference. An Open Service Access (OSA) service capability server (SCS) 114 interfaces on one side with the S-CSCF 102 via an ISC interface 104, and to the other side to an OSA framework Application Server 116 and provides a standardized way for third party secure access to the IM subsystem. The Application Servers 106 and 108 can also interact with a Multimedia Resource Function Controller (MRFC) 118 via the S-CSCF 102 (ISC 104 and Mr 119 interfaces) in order to control Multimedia Resource Function processing. In particular, an MRFC is responsible for controlling and setting up the resources for a conference call. Finally, a Home Subscriber Server (HSS) 120 connects to the S-CSCF 102 via a Cx interface 122 and is responsible for storing and providing subscriber related information. The functioning of the network 100 for setting up and caring on SIP-based data calls and conference calls is fully described in the above-mentioned 3GPP technical specifications 23.218 and 23.228 Release 5, which are herein enclosed by reference.

However, the teaching of the above-mentioned 3GPP specifications is limited to call cases scenario wherein call conferencing is conducted between User Equipment (UE) that are within the same serving network, or between UE that are served by different serving networks but whose conference call is handled by their home network MRFC. With reference being now further made to FIG. 1, for example, when $UE_1$ 124, $UE_2$ 126, and $UE_3$ 128 are involved in a conference call, and they connect via an access network 130 to the serving network 100, the resources for the conference call are handled by the home network's MRFC 118, even in cases when one or more of the UEs are roaming outside their home network 100. This results in the multimedia traffic to be sometimes routed following lengthy routes, which results in an increase of the conferencing costs, especially in cases wherein the conferencing involves the exchange of considerable amount of data information such as for example in the case of multimedia call conferencing. The existing 3GPP technical specifications fail to teach any optimized call conferencing scenario wherein the selection of the MRFC handling conference calls may be other than the home network's MRFC.

Accordingly, it should be readily appreciated that in order to overcome the deficiencies and shortcomings of the existing solutions, it would be advantageous to have a method and system for efficiently setting up and caring on economic call session conferencing. The present invention provides such a method and system.

SUMMARY OF THE INVENTION

In one aspect, the present invention is a method for setting up a conference call in a telecommunications network, the method comprising the steps of:

determining in a first network that a pre-defined condition is met; and when the pre-defined condition is met, delegating a responsibility for setting up resources for the conference call for a User Equipment (UE) to a Multimedia Resource Function Controller (MRFC) of a second network.

In another aspect, the present invention is a telecommunications system comprising:

a User Equipment (UE) capable of carrying on a conference call;

a first network, the home network comprising a Serving Call State Control Function (S-CSCF) and an Application Server (AS); and a second network comprising an S-CSCF, an AS, and a Multimedia Resource Function Controller (MRFC);

wherein when the AS of the first network determines that a pre-defined condition is met, the first network delegates a responsibility for setting up resources for the conference call for the UE to the MRFC of the second network.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

According to a first preferred embodiment of the present invention, there is provided a method and system that allows a network operator to delegate the settings of a conference call to another operator, when a predefined condition is met. For example, when a Multimedia Resource Function Controller (MRFC) of the given network operator experiences a state of resources overload or a failure, it may be desirable to delegate the responsibility for setting up and carrying on the conference call to another MRFC from another, yet associated, network operator, so that the condition of the first MRFC does not preclude the adequate setup of the conference call. Another case where conference delegation may be used according to the present invention is when a first network operator does not possess its own MRFC but desires to provide conferencing services. In order to delegate the responsibility for handling a conference call, the first operator may map a conference Uniform Resource Indicator (URI) that identifies the conference to be delegated into a conference URI that is understandable by the second operator, and provides the second conference URI to the second network operator in a request for handling the resources for the conference call. Then, the second operator's MRFC can perform resource allocation for the delegated conference.

Figure 2:
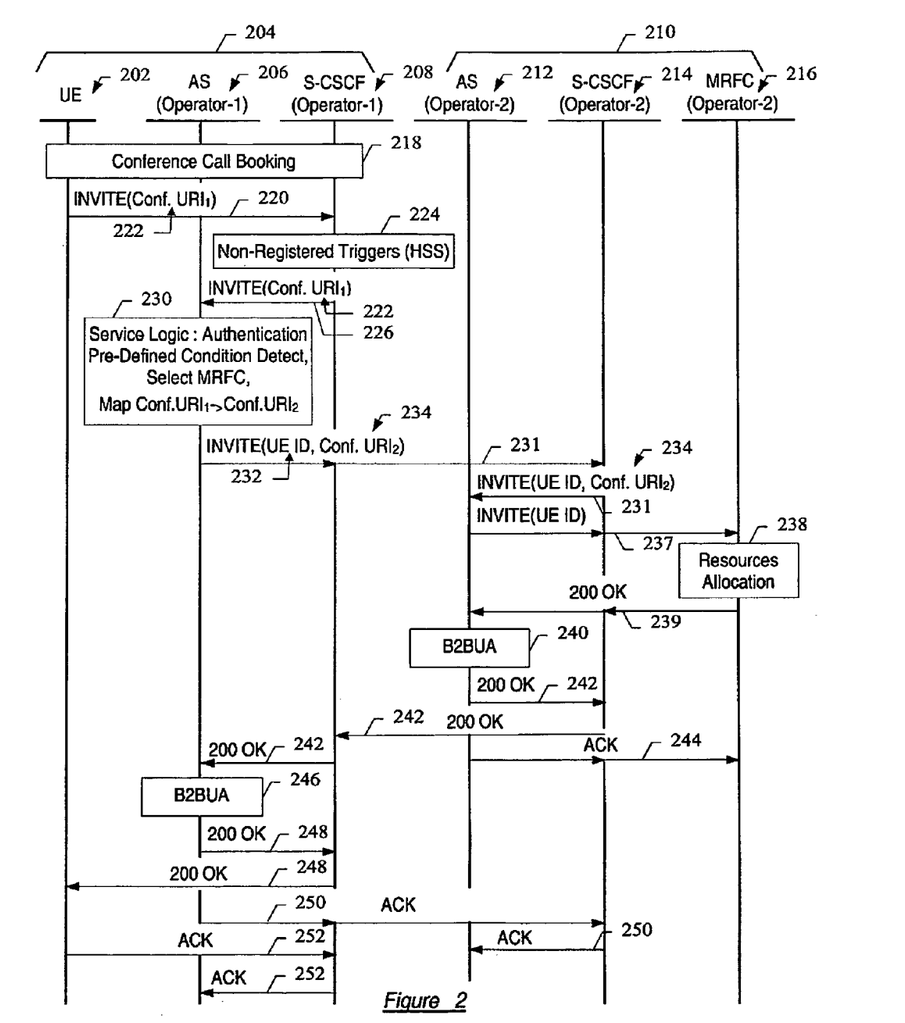
FIG. 2 is a nodal operation and signal flow diagram of the preferred embodiment of the invention related to a delegation from a first operator to a second operator of the setting of a pre-arranged conference call.

Reference is now made to FIG. 2 which is a nodal operation and signal flow diagram of the preferred embodiment of the invention related to the delegation from a first operator's network to a second operator's network of the setting of a Session Initiation Protocol (SIP) based conference call. FIG. 2 shows a User Equipment (UE) 202 evolving, for example, in its home network 204, that also comprises an Application Server (AS) 206 and a Serving Call State Control Function (S-CSCF) 208. It is understood that the network 204 may further comprise other types of nodes, which are not represented in FIG. 2 for the sake of simplicity. The network 204 may be any kind of telecommunications network, including but being not limited to a Global System for Mobile communications (GSM) like cellular telecommunications system, a Code Division Multiple Access (CDMA) based cellular telecommunications system like for example the W-CDMA or the CDMA-2000 systems, or a GPRS/UMTS based system. Likewise, also shown in FIG. 2, is a second network 210 comprising its own AS 212, S-CSCF 214, and a Multimedia Resource Function Controller (MRFC) 216. The network 210 may also comprise other types of nodes, which are not shown in FIG. 2.

The call case scenario depicted in relation to FIG. 2 assumes that a conference call was booked by any one of the participants and that the UE 202 is located in a geographical area served, or also served, by the network operator of the network 210, which provided a list of conference URIs to be used by the operator of the network 204, as part of their inter-operator agreement. It is however to be understood that the present invention is not limited to the present call case scenario, which is only provided as an illustrative exemplary scenario, but may rather apply to various other preferred implementations, such as for example to dial-in (participants call the AS) ad-hoc conferences, or to any kind of dial-out (AS call the participants) pre-arranged conference calls.

With reference being further made to the exemplary call case scenario of FIG. 2, in action 218 a conference call is booked by any one of the participants, so that the participants are provided with a conference $URI_1$ 222 identifying the call conference. In action 220, the UE 202 sends an INVITE message with the conference $URI_1$ 222 that identifies the booked conference to the S-CSCF 208 of its home network, in order to join the conference. In action 224, the S-CSCF 208 may retrieve triggers from the Home Subscriber Server (HSS, not shown) in order to register the conference call with the network, in the case this action has not yet been performed. In action 226, the S-CSCF 208 forwards the INVITE message 226 to the AS 206, which, upon receipt of the message performs service logic associated with the establishment of the conference call, action 230. For example, the AS 206 may perform authentication of the UE 202, verify the user's rights to receive call conferencing service, detect the pre-defined condition for conference call delegation (resources overload or failure of the home network MRFC, automatic delegation of the conference call, etc), and then select the MRFC 216 of operator 210 for handling the conference call. Then, the AS 206 may map the conference $URI_1$ 222 that identifies the conference call for the first network 204 into another conference URI (Conf. $URI_2$ 234) that identifies the conference call for the second network operator 210. The AS 206 signals the S-CSCF 214 of the $2^{nd}$ network 210, with an INVITE message 231 comprising i) the identity 232 of the UE 202 that desires to join the conference call, and ii) the conference URI₂ 234 of the network 210, which was mapped to the conference URI₁ 222 by the service logic in action 230. Upon receipt of the INVITE message 231, the S-CSCF 214 forwards the message to the AS 212 of the second network 210, which sends another INVITE message 237 with the identity of the UE 202 to the MRFC 216 of the network 210 for requesting the MRFC 216 to handle the resources for the conference call. Responsive to this request, the MRFC 216 sets up the required resources for the conference call in action 238. The AS 212 receives a 200 OK confirmation message 239 from the MRFC 216 and may initiate a Back-to-Back User Agent (B2BUA) connection at action 240. Once done, the AS 212 returns a 200 OK confirmation 242 to S-CSCF 214, which forwards it to S-CSCF 208 in the first network 204. At substantially the same time, the AS 212 also sends an acknowledgement message 244 to the MRFC 216 for acknowledging the establishment of the conference call connection. The S-CSCF 208 also relays the 200 OK message 242 to the AS 206 of the first network 204, so that the AS 206 also initiates a B2BUA connection at action 246. Once completed, a 200 OK confirmation 248 is sent via the S-CSCF 208 to the UE 202 for confirming the connection to the conference call. Finally, acknowledgement of the SIP session being established are sent from the AS 206 to the S-CSCF 214 and back to the AS 212, action 250, and from the UE 202 to the AS 206 via the S-CSCF 208, action 252. At that point, UE 202 has joined the conference call through the MRFC 216 of the network 210. Other UEs may also join the conference call, using their own network MRFC as it is known in the art, or another MRFC as described hereinbefore in relation to UE 202.

According to a second preferred embodiment of the present invention, there is provided a method and system that allows a network operator to distribute the settings of a conference call to one or more MRFC that belong to its own home network, or to the network of another operator, based on the location of the participants to the conference call. According to this preferred embodiment of the invention, location information about conference participants is provided at the time the conference is booked, or alternatively when the conference call is being established via a location functionality (not shown). As a consequence, not all participants are associated to the same MRFC since the mapping of the conference URI, which identifies the conference, to an MRFC URI, which identifies the MRFC handling the conference resources, is not unique for all participants. According to the present second preferred embodiment of the invention, as soon as a threshold number of participants, such as for example one or two participants, are associated to a given MRFC, the different MRFC is selected by the application for setting up the resources related to the participant(s) in question for that conference call. The threshold number of participants is so selected as to allow a traffic gain, or economy, to be realized when the participants are switched from the default MRFC to the alternative MRFC. During the conference call, the first MRFC is used as an anchor for the conference, and each time a participant connects to the conference call through another MRFC, the new MRFC is automatically added to the conference in the anchor MRFC, like another participant. According to the invention, graceful release of MRFCs involved in a given conference may also be performed when all the participants connected to that MRFC leave the conference. Conference distribution may also be performed from a first network operator to a second network in a similar manner to the conference delegation described hereinbefore, by mapping the conference URI of the first operator to another conference URI from a second operator. Therefore, according to the second preferred embodiment of the invention, the given conference call may happen to involve one or more MRFCs that may belong to the same network operator, in case the former operates network domains that extend through various geographical areas, or to different network operators, depending upon the location of the participants involving that conference.

Figure 3:
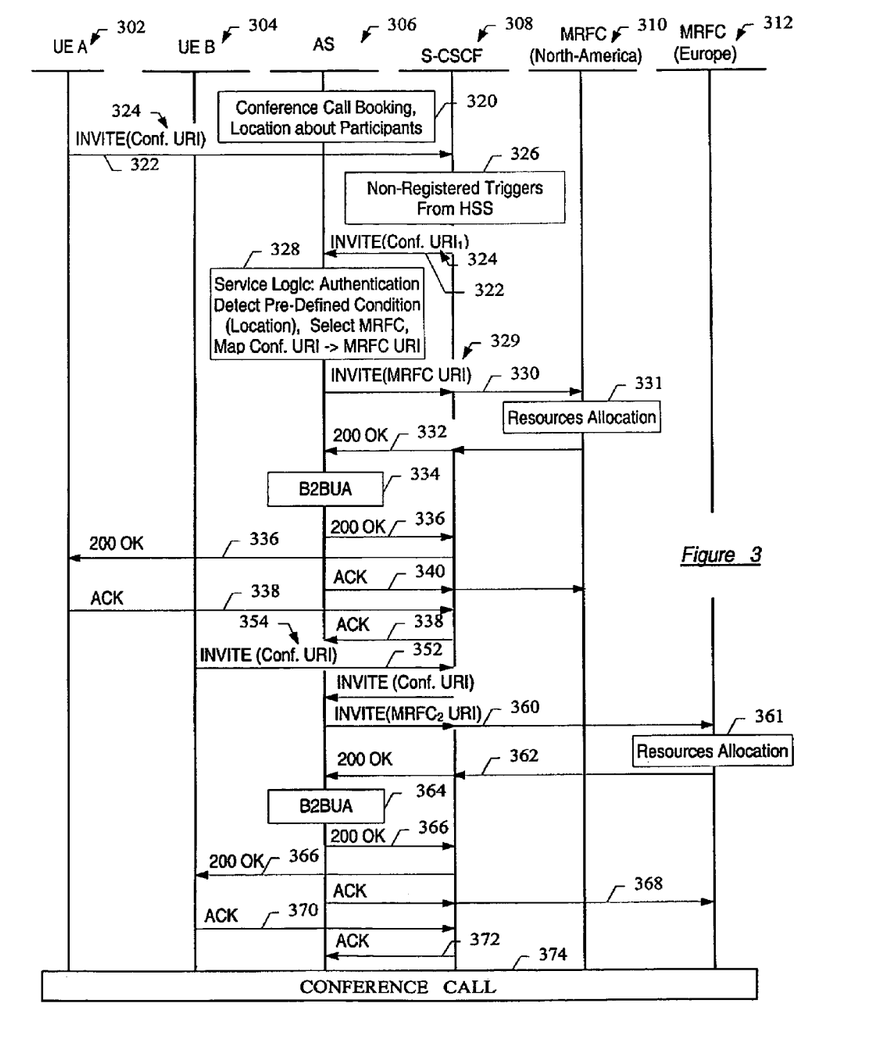
FIG. 3 is a nodal operation and signal flow diagram of the preferred embodiment of the invention related to the distribution from a first operator's network to a second operator's network of a conference call.

Reference is now made to FIG. 3, which is an exemplary nodal operation and signal flow diagram of the preferred embodiment of the invention related to the distribution among a plurality of networks of the setting of an SIP-based conference call in the case location information about the participants to the conference was provided at the time the conference was booked. FIG. 3 shows a first User Equipment (UE A) 302 evolving in its home network in, for example, North America, the network comprising an Application Server (AS) 306, a Serving Call State Control Function (S-CSCF) 308, and an Multimedia Resource Function Controller (MRFC) 310. It is understood that the network 204 may further comprise other types of nodes, which are not represented in FIG. 3 for the sake of simplicity. Likewise, also shown in FIG. 3, is a second UE B 304 that evolves in another network, such as for example in a network in Europe, the network having its own MRFC 312. The European network may also comprise other types of nodes, which are not shown in FIG. 3. The networks shown may be any kind of telecommunications network, including but being not limited to a Global System for Mobile communications (GSM) like cellular telecommunications system, a Code Division Multiple Access (CDMA) based cellular telecommunications system like for example the W-CDMA or the CDMA-2000 systems, or a GPRS/UMTS based system.

The call case scenario depicted in relation to FIG. 3 assumes that a conference call was booked by any one of the participants and that information about the location of the participants (only participants UE A 302 and UE B 304 are shown in FIG. 3) was provided at the time of the booking, so that the booking application selected the MRFC 310 for handling the resources for UE A 302 located in North America, and for acting as an anchor MRFC too, while the MRFC 312 was selected for handling the conference call resources for UE B 304 located in Europe. It is however understood that the present invention is not limited to the present call case scenario, which is only provided as an illustrative exemplary scenario, but may rather apply to various other preferred implementation, such as for example to dial-in (participants call the AS) ad-hoc conferences where the location information is provided at the beginning of the conference call, or to any kind of dial-out (AS call the participants) pre-arranged conference calls.

With reference being further made to the exemplary scenario of FIG. 3, in action 320, when the conference is booked, it is specified the location of the participants, such as for example that the UE A 302 is located in North America while the UE B 304 is located in Sweden. In action 322, when the time for actually joining the conference comes, UE 302 may first send to the S-CSCF 308 an INVITE message comprising the conference URI 324 that identifies the conference user UE A 302 desires to join, wherein the conference URI 324 was preferably provided to UE A 302 at the time of the conference booking. In action 326, the S-CSCF extracts non-registered triggers from the HSS (not shown) in order to register the conference call with the network. Then, the S-CSCF 308 relays the INVITE message 322 to the AS 306, which upon receipt of the message performs service logic associated with the establishment of the conference call, action 328. For example, the AS 306 may perform authentication of the UE A 302, verify the user's rights to receive call conferencing service, detect the condition associated with the location of the parties, and based on the location, select the MRFC for handling conference call resources for the given UE, therefore mapping the conference URI 324 to an MRFC URI 329. In action 330, the AS 306 signals the selected MRFC 310 with an INVITE message comprising the MRFC URI 329 for requesting the establishment of the resources for the conference call. In action 331, the MRFC 310 allocates the requested resources for the call conference, and further responds with a 200 OK message 332 for confirming that it allocated the required resources for the UE A 302 for the present conference call. Back-to-Back User Agent (B2BUA) connection functionality is established in action 334. The establishment of the conference call connection is confirmed in action 336 to the S-CSCF 308 and further to the UE A 302. The AS 306 acknowledges to the S-CSCF 308 and to the S-CSCF 310 the connection successful setup via an acknowledgement message 340. An acknowledgement message 338 is also sent from the UE 302 to the S-CSCF 308 and further to the AS 306 for the same purpose. At this point, the resources for the conference call associated to the UE A 302 are successfully established and the UE A 302 successfully connected to the conference call.

UE B 304 also joins the conference call in actions 352–372 in a manner similar to the one described for UE A 302 in actions 322–342, except for the fact that given the location of UE B 304, it is the MRFC 312 from Europe that is selected in action 328 to allocate the resources for the conference call for the UE B 304, instead of MRFC 310. At step 374, the conference call involving UE A 302 and UE B 304 is carried on.

Based upon the foregoing, it should now be apparent to those of ordinary skills in the art that the present invention provides flexible selection of the preferred MRFC that is to allocate the resources for a conference call for a given user equipment, when pre-defined conditions are met. In the first embodiment of the invention, the pre-defined condition may be associated with a status of an MRFC, such as for example with a resources overload, a failure, or a lack of MRFC in a first network, in which case another MRFC from another network is delegated for the resources allocation. In a second preferred embodiment of the invention, the pre-defined condition is associated to the location of the user equipment, so that the selection of the MRFC is based on the user equipment location. Although the system and method of the present invention have been described in particular reference to certain call case scenarios, it should be realized upon reference hereto that the innovative teachings contained herein are not necessarily limited thereto and may be implemented advantageously with respect to other signaling scenarios. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow. For example, while the first and second preferred embodiment of the invention have been separately described, it is understood that they can be implemented together, by, for example, selecting the MRFC based on both the location of the user equipment and based on a status condition of a first MRFC.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for setting up a conference call in a Internet Protocol (IP) Multimedia Subsystem (IMS)-compatible telecommunications network, the method comprising the steps of:
   determining in a first network of a first operator that a pre-defined condition associated with a status of Multimedia Resource Function Controller (MRFC) of the first network is met; and
   when the pre-defined condition is met, delegating a responsibility for setting up resources for the conference call for a User Equipment (UE) to a MRFC of a second network of a second operator, wherein the UE is located in a geographical area that is served by at least one of the first network and the second network.

2. The method claimed in claim 1, wherein the pre-defined condition is associated with a resources overload of the MRFC of the first network.

3. The method claimed in claim 1, wherein the pre-defined condition is associated with a failure of the MRFC of the first network.

4. The method claimed in claim 1, wherein the first network does not have an MRFC, and the pre-defined condition is associated with an inexistence of the MRFC in the first network.

5. The method claimed in claim 1, wherein the step of delegating further comprises the steps of:
   responsive to determining the pre-defined condition, selecting the MRFC of the second network for allocating resources for the conference call for the UE, and mapping a conference call identifier of the first network into a conference call identifier of the second network;
   sending from an Application Server (AS) of the first network to a Serving Call State Control Function (S-CSCF) of the second network an instruction for setting up the resources for the conference call for the UE, the instruction comprising the conference call identifier of the second network and an identity of the UE;
   relaying the instruction from the S-CSCF to an Application Server (AS) of the second network;
   instructing the MRFC of the second network to set up resources for conference call of the UE;
   allocating the resources for the conference call for the UE by the MRFC of the second network; and
   informing the UE that the resources for the conference call have been allocated.

6. The method claimed in claim 5, wherein:
   the conference call identifier of the first network and the conference call identifier of the second network are both Uniform Resource Identifiers (URI);
   the instruction for setting up the resources for the conference call for the UE comprises a Session Initiation Protocol (SIP) INVITE message; and
   the step of instructing the MRFC of the serving network to set up resources for the UE comprises sending an INVITE message from the AS of the second network, via the S-CSCF, to the MRFC of the second network.

7. The method claimed in claim 5, further comprising the steps of:
setting up a Back-to-Back User Agent (B2BUA) connection by the AS of the second network and by the AS of the first network.

8. The method claimed in claim 1 further comprising a step of receiving a list of conference URIs in the first network from the second network.

9. The method claimed in claim 8, wherein the step of receiving a list is performing during establishment of an inter-operator agreement between the first operator of the first network and the second operator of the second network.

10. The method claimed in claim 8, wherein the step of delegating a responsibility for setting up resources for the conference call for a User Equipment (UE) is performed by sending a Session Initiation Protocol (SIP) INVITE message to the second network, the SIP INVITE message comprising an identifier of the UE and a Conference Universal Resource Identifier (URI) from the list of conferences URIs previously received.

11. The method claimed in claim 1, wherein the step of delegating a responsibility for setting up resources for the conference call for a User Equipment (UE) is performed by sending a Session Initiation Protocol (SIP) INVITE message to the second network, the SIP INVITE message comprising an identifier of the UE and a Conference Universal Resource Identifier (URI) that identifies the conference call to be delegated in a manner understandable to the second network.

12. A method for setting up a conference call in a Internet Protocol (IP) Multimedia Subsystem (IMS)-compatible telecommunications network, the method comprising the steps of:
determining in a first network that a pre-defined condition associated with a location of a User Equipment (UE) is met; and
when the pre-defined condition is met, delegating a responsibility for setting up resources for the conference call for the UE to a Multimedia Resource Function Controller (MRFC) of a second network, wherein the UE is located in a geographical area that is served by one of the first network and the second network.

13. The method claimed in claim 12, wherein the UE is located in the second network, which is a serving network.

14. The method claimed in claim 13, wherein the step of delegating further comprises the steps of:
sending from the UE a request for joining the conference call to a Serving Call State Control Function (S-CSCF) of the serving network, the request comprising an identity of the conference call for the first network;
forwarding the request from the S-CSCF to an Application Server (AS) of the first network;
based on the location of the UE, selecting the MRFC of the serving network for allocating resources for the conference call for the UE;
instructing from the first network the MRFC of the serving network to set up resources for the UE;
setting up the resources for the conference call for the UE by the MRFC of the serving network; and
informing the UE that the resources for the conference call have been set up.

15. The method claimed in claim 14, wherein:
the conference call identifier of the serving network is a Uniform Resource Identifiers (URI);
the request for joining the conference call comprises a Session Initiation Protocol (SIP) INVITE message; and
the step of instructing the MRFC of the serving network to set up resources for the UE comprises sending an INVITE message from the AS, via the S-CSCF, to the MRPC of the serving network.

16. The method claimed in claim 14, further comprising the steps of:
setting up a Back-to-Back User Agent (B2BUA) connection by the AS of the first network.

17. The method claimed in claim 12, wherein the first network is the home network of the UE, and the second network is a visited network operated by a different network operator.

18. The method claimed in claim 12, wherein the first network is the home network of the UE, and the second network is a visited network operated by the same network operator.

19. A Internet Protocol (IP) Multimedia Subsystem (IMS)-compatible telecommunications system comprising:
a User Equipment (UE) capable of carrying on a conference call;
a first network, the home network comprising a Serving Call State Control Function (S-CSCF) and an Application Server (AS);
a first MRFC of the first network of the UE;
a second network comprising second S-CSCF, second AS, and a second Multimedia Resource Function Controller (MRFC);
wherein when the AS of the first network determines that a pre-defined condition is met, the first network delegates a responsibility for setting up resources for the conference call for the UE to the second MRFC of the second network and wherein the pre-defined condition is associated with a status of the MRFC of the first network of the UE; and
wherein responsive to the determination of the pre-defined condition, the AS of the first network selects the second MRFC of the second network for allocating resources for the conference call for the UE, and maps an identifier of the conference call of the first network into an identifier of the conference call of the second network, and sends to the second S-CSCF of the second network an instruction for setting up the resources for the conference call for the UE, the instruction comprising the identity of the conference call for the second network and an identity of the UE, wherein the second S-CSCF of the second network relays the instruction to the second AS of the second network, the second AS instructing the second MRFC of the second network to set up resources for the UE.

20. The telecommunications system claimed in claim 19, wherein the pre-defined condition is associated with a resources overload of the MRFC of the first network of the UE.

21. The telecommunications system claimed in claim 19, wherein the pre-defined condition is associated with a failure of the MRFC of the first network of the UE.

22. The telecommunications system claimed in claim 19, wherein the first network does not have an MRFC, and the pre-defined condition is associated with an inexistence of the MRFC in the first network.

23. The telecommunications system claimed in claim 19, wherein the first network and the second network do not have the same operator and wherein the UE is in a geographical area served by both the first network and the second network.

24. The telecommunications system claimed in claim 19, wherein:

the identifier of the conference call of the first network and the identifier of the conference call of the second network are both Uniform Resource Identifiers (URI);

the instruction for selling up the resources for the conference call for the UE comprises a Session Initiation Protocol (SIP) INVITE message; and for instructing the MRFC of the second network to set up resources for the UE, the AS of the second network sends an INVITE message to the MRFC of the second network via the S-CSCF of the second network.

25. The telecommunications system claimed in claim 19, wherein the AS of the second network and the AS of the first network set up a Back-to-Back User Agent (B2BUA) connection.

26. A Internet Protocol (IP) Multimedia Subsystem (IMS)-compatible telecommunications system comprising:

a User Equipment (UE) capable of carrying on a conference call;

a first network, the home network comprising a Serving Call State Control Function (S-CSCF) and an Application Server (AS);

a second network comprising second S-CSCF, second AS, and a second Multimedia Resource Function Controller (MRFC);

wherein when the AS of the first network determines that a pre-defined condition is met, the first network delegates a responsibility for setting up resources for the conference call for the UE to the MRFC of the second network and wherein the pre-defined condition is associated with a location of the UE; and wherein the UE sends a request for joining the conference call to the S-CSCF of the first network, the request comprising an identity of the conference call for the first network, the S-CSCF of the first network forwarding the request to the AS of the first network, which selects the second MRFC of the second network for allocating resources for the conference call for the UE based on the location of the UE, and instructs the second MRFC of the second network to set up resources for the UE.

27. The telecommunications system claimed in claim 26, wherein the UE is located in the second network, which is a serving network.

28. The telecommunications system claimed in claim 26 wherein the first network and the second network do not have the same operator and wherein the UE is in a geographical area that is not served by both the first network and the second network.

29. The telecommunications network claimed in claim 26, wherein the MRFC of the serving network allocates the resources for the conference call for the UE and informs the UE via the S-CSCF and the AS of the first network that the resources for the conference call have been set up.

30. The telecommunications system claimed in claim 29, wherein:

the identifier of the conference call of the serving network is a Uniform Resource Identifiers (URI);

the request for joining the conference call comprises a Session Initiation Protocol (SIP) INVITE message; and for instructing the second MRFC of the serving network to set up resources for the UE, the AS sends an INVITE message, via the S-CSCF.

31. The telecommunications system claimed in claim 28, wherein the second AS of the serving network sets up a Back-to-Back User Agent (B2BUA) connection.

* * * * *

UNITED STATES PATENT AND TRADEMARK OFFICE
CERTIFICATE OF CORRECTION

| | | |
|---|---|---|
| PATENT NO. | : 7,027,577 B2 | Page 1 of 1 |
| APPLICATION NO. | : 10/227503 | |
| DATED | : April 11, 2006 | |
| INVENTOR(S) | : Gourraud et al. | |

It is certified that error appears in the above-identified patent and that said Letters Patent is hereby corrected as shown below:

In Column 8, Line 15, in Claim 1, after "of" insert -- a --.

In Column 10, Line 4, in Claim 15, delete "MRPC" and insert -- MRFC --, therefor.

In Column 10, Line 25, in Claim 19, after "comprising" insert -- a --.

In Column 10, Line 25, in Claim 19, insert -- a -- before "second".

In Column 11, Line 4, in Claim 24, delete "selling" and insert -- setting --, therefor.

In Column 11, Line 22, in Claim 26, after "comprising" insert -- a --.

In Column 11, Line 22, in Claim 26, insert -- a -- before "second".

In Column 12, Line 30, in Claim 31, delete "28" and insert -- 30 --, therefor.

Signed and Sealed this

Twentieth Day of November, 2007

JON W. DUDAS
*Director of the United States Patent and Trademark Office*